May 17, 1938.   E. J. ROGERS   2,117,824

METHOD OF MAKING WELTS

Original Filed Feb. 6, 1937   2 Sheets-Sheet 1

Inventor
Ernest J. Rogers
By William W. Deane
his Attorney

May 17, 1938.  E. J. ROGERS  2,117,824
METHOD OF MAKING WELTS
Original Filed Feb. 6, 1937   2 Sheets-Sheet 2
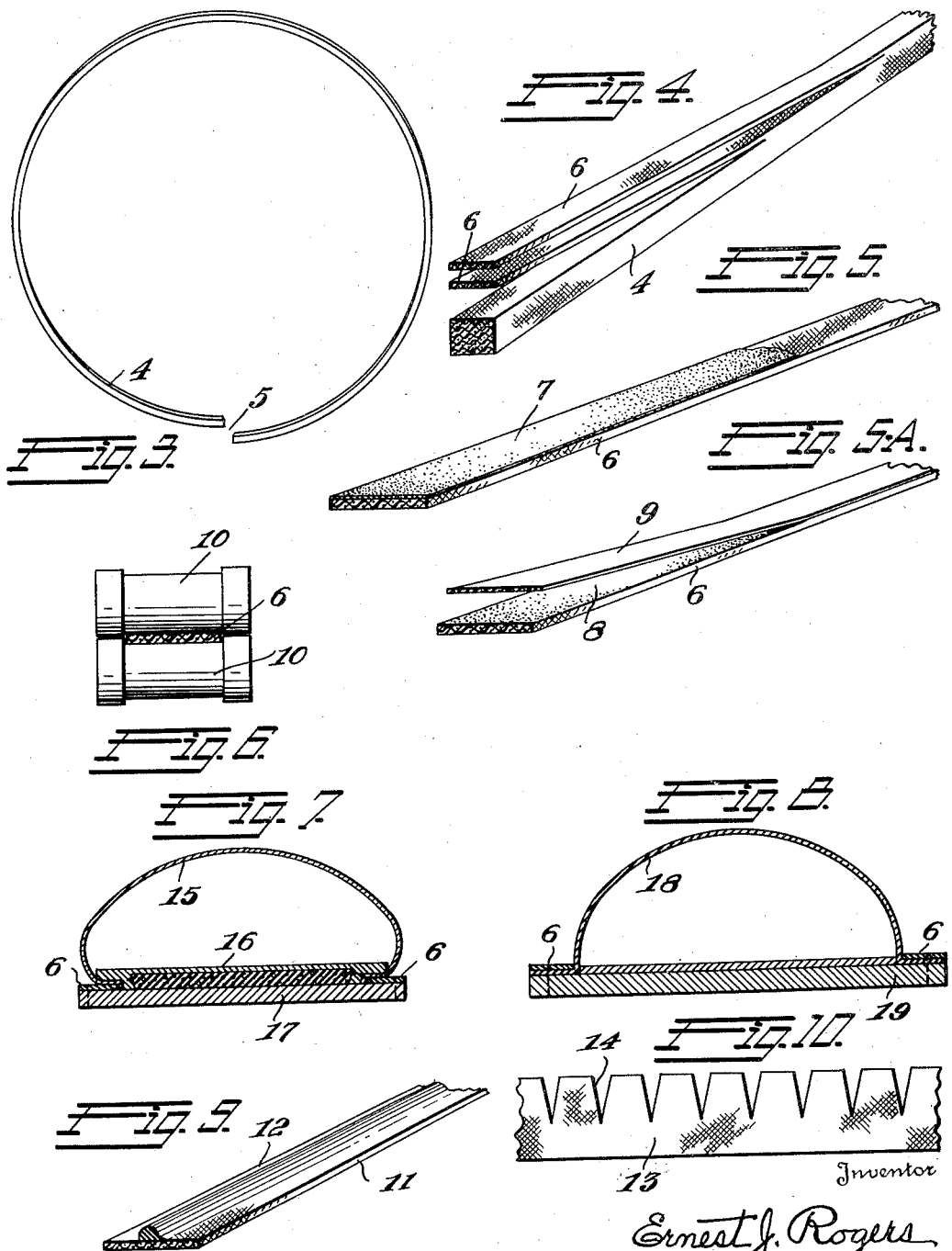
Inventor
Ernest J. Rogers
By William D. Deane
his Attorney Patented May 17, 1938

2,117,824

UNITED STATES PATENT OFFICE 2,117,824

METHOD OF MAKING WELTS

Ernest J. Rogers, Dover, N. H.

Application February 6, 1937, Serial No. 124,499
Renewed March 31, 1938

6 Claims. (Cl. 12—146)

This invention is directed to an improvement in welts for shoes and method of making same, wherein to materially reduce the cost and simplify the production of the welt, while at the same time maintain maximum strength and adaptability of the product.

The primary object of the invention is to utilize worn tire casings as the product base, divide such casings along the circumferential line into strips approximating the desired width of the welt, divide each strip longitudinally into parts approximating the desired thickness of the welt, and appropriately treat or finish that portion of each part serving at the exposed surface of the welt when applied to the shoe.

The method will be identified in the detailed description of the invention in the light of the accompanying drawings, in which:

Fig. 3 is an elevation of a welt-forming strip as separated from the tire.

Fig. 4 is a broken perspective view showing the strip of Fig. 3 longitudinally divided to provide parts of proper welt thickness.

Fig. 5 is a perspective of a welt strip with the exposed surface thereof treated for finish purposes.

Fig. 5A is a similar view, showing the welt strip provided with an additional finishing layer.

Fig. 6 is a view in elevation showing conventional rollers for vulcanizing the welt strip in the finishing process.

Fig. 7 is a sectional view showing the welt applied to a Goodyear-welt shoe.

Fig. 8 is a similar view showing the welt applied to a stitch-down type of shoe.

Fig. 9 is a perspective view showing a modified type of welt, designed for use as a storm welt.

Fig. 10 is a perspective view of a further modified type of welt strip.

Figure 1:
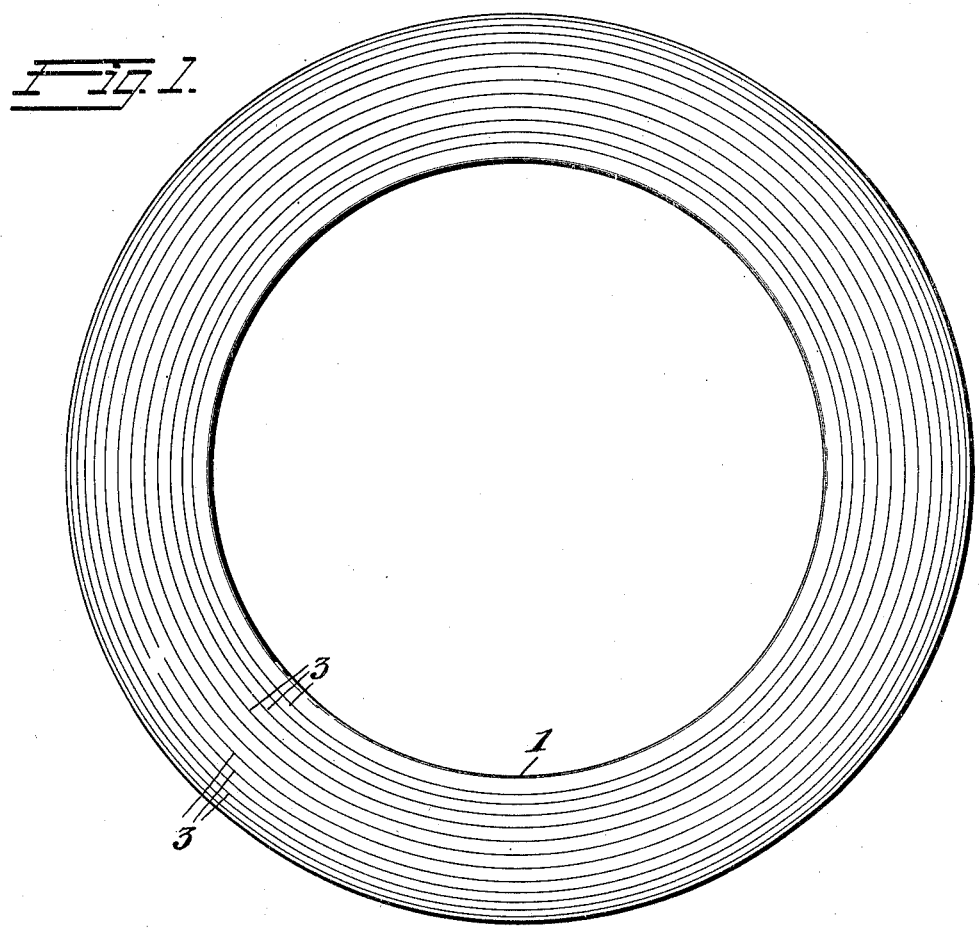
Fig. 1 is a view in elevation of a tire, the lines of division for the purposes of forming the welt sections in accordance with the present invention being indicated.
Figure 2:
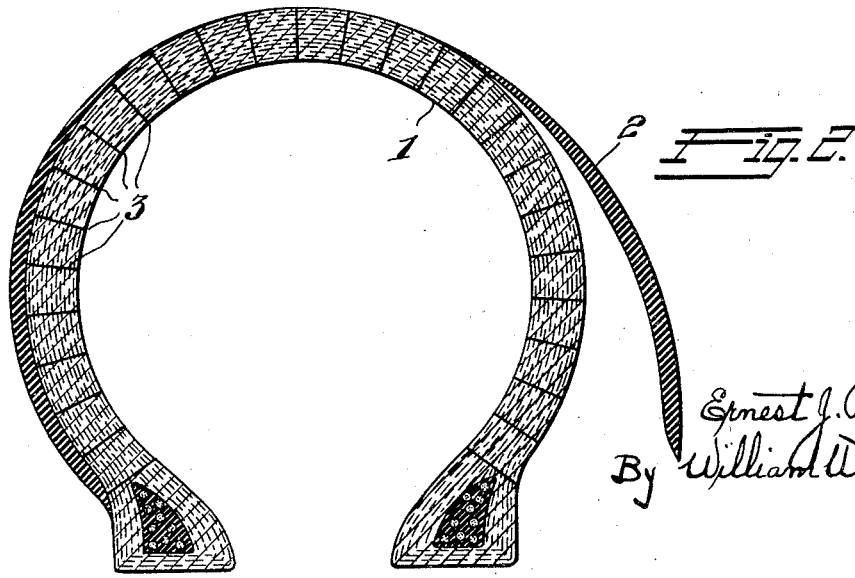
Fig. 2 is a longitudinal section of the tire, showing the outer rubber wall, which for the purposes of the invention is to be discarded, such rubber wall being indicated as partly removed.

In carrying out the method, a worn or discarded tire casing 1 is utilized, and the rubber surface layer, indicated at 2 in Fig. 2 is removed. This rubber surface layer has been worn from the tread surface of the casing and is usually present only along the side walls, as indicated. The casing free of its outer rubber layer, is then divided on circumferential lines, indicated at 3 in Fig. 1, with the lines of cut spaced apart approximately equal to the width of the desired welt strip.

The means and manner of cutting is unimportant so far as the present invention is concerned and may be accomplished by forcing a knife through the casing on the desired lines, or by dividing the casing transversely and moving the same relative to a fixed or moving knife. The invention contemplates any desired or conventional means whereby the casing may be divided into strips, indicated at 4 in Fig. 3, which in thickness between lines of cut are approximately equal to the width of the desired welt. The strip 4, if it has been severed in endless form, is then divided transversely, as indicated at 5 in Fig. 3, and flattened out.

The strip 4, either in full or divided lengths, is then divided by appropriate or conventional means, and parallel to the surface of the strip defining the width of the completed welt, into strips 6, with the thickness of such strips 6 approximately equal to the thickness of the desired welt. Of course, each strip 4 will provide a number of welt strips 6, it being noted, however, that the distance between the lines of cut 3 of the tire casing defines the width of the welt strip, while the distance between the lines of cut defining the strips 6 determines the thickness of the welt strips.

Each welt strip 6 is then, in one completed form, coated with a surface layer of vulcanizable rubber, as at 7, Fig. 5, or such strips 6 may, as indicated in Fig. 5A be coated on the surface with a vulcanizable rubber cement, indicated at 8, and a thin section of leather or other like material 9 applied on the cement surface. In either form the welt strip 6, with the rubber or leather surface, is subjected to a vulcanization, as by means of the heated rolls 10 of Fig. 6, to provide a finished surface for the exposed portion of the welt strip when in applied position in the shoe.

If desired, and as contemplated as a form of the present invention, the welt strip may be formed for use in heavy storm shoes and the like, wherein such strip, indicated at 11 in Fig. 9, may be formed with an upstanding rib 12, ordinarily employed to fit snugly against the upper of the finished shoe for protective purposes. This rib 12 may be formed after completing the strip according to the method above described, by flowing a ridge of suitable vulcanizable material on the surface of the strip and then vulcanizing the same; or, if desired, the rib 12 may be formed as an integral part of the welt strip as formed in the manner indicated in Fig. 4, through the use of appropriately-formed cutting tools in the severance of the strips.

In Fig. 10, another form of welt strips is shown, wherein the relatively inner edges of such strips, indicated at 13 in Fig. 10, are serrated, as at 14, forming a welt of the well-known "McKay" type. The manner of forming this type of welt strip forms no part of this invention and any desired or conventional means may be employed.

In Fig. 7 the welt is shown as applied to a "Goodyear" welt shoe, in whoch the welt and upper 15 are stitched to the insole 16, and the outsole 17 is stitched to the welt 6. The usual filler is employed.

Fig. 8 shows a stitch-down type of shoe, in which the upper 18 and overlying welt 6 are stitched to the outsole 19. The adaptability of the welt of this invention to the different types of shoes is thus clear.

While the welt as used in the construction of shoes is necessarily relatively thin, it nevertheless plays an important part in firmly holding the parts of the shoe in position. This is particularly true in the "Goodyear" type, for here the outsole is secured only to the welt.

The invention therefore utilizes and makes valuable a heretofore substantially waste product. The nature of this product, by its embedded fabric, cords, and rubber, associated to provide sufficient strength to resist breakage under the strain of use as a tire, provides an admirable base for a welt strip. Even in the necessarily thin form, the welt so produced is strong much stronger than the ordinary welt, is readily penetratable in stitching, and by appropriate and well-known methods can be made to carry any color or desired finish, without sacrifice of either strength or wear resistance.

As a further use for the welt, it also can be applied to a "Compo" shoe for firmly holding the parts thereof together, the welt being cemented to the shoe instead of stitched, and is constructed in the same manner as the other welts herein specified.

Having thus described the invention, what is claimed as new, is:—

1. The method of making a shoe welt, consisting in dividing the casing of a tire on circumferential lines spaced apart approximately equal to the width of the desired welt, and then dividing the strips so formed longitudinally into sections of the desired thickness of the welt.

2. The method of making a shoe welt, consisting in dividing the casing of a tire from which the surface rubber layer has been removed into strips extending circumferentially of the casing and of a width approximating the width of the desired welt, and then dividing the strips so formed into sections of the desired thickness of the welt.

3. The method of making a shoe welt, consisting in separating the rubber surface layer from a worn tire casing, dividing the casing on lines extending around the casing into strips of the width desired for the welt, then dividing the strips at right angles to the line of the first division into sections approximating the thickness of the desired welt.

4. A method according to claim 3, with the additional step of finishing the surface of the welt which is exposed in the shoe use of the welt.

5. A method as defined in claim 3 with the additional step of applying a rubber coating to the welt strips and vulcanizing the coating to the strip.

6. A method as defined in claim 3 with the additional step of applying rubber adhesive to the exposed face of the welt, applying a leather strip to the adhesive and vulcanizing the adhesive.

ERNEST J. ROGERS.